United States Patent [19]
Yamamoto et al.

[11] Patent Number: 5,614,299
[45] Date of Patent: Mar. 25, 1997

[54] HEAT-RESISTANT UNSATURATED POLYESTER RESIN COMPOSITION AND HEAT-RESISTANT FIBER-REINFORCED COMPOSITE MATERIAL

[75] Inventors: Koji Yamamoto, Kobe; Takeshi Kuri, Nishinomiya, both of Japan

[73] Assignee: Kabushiki Kaisha Kobe Seiko Sho, Kobe, Japan

[21] Appl. No.: 606,816

[22] Filed: Feb. 26, 1996

[51] Int. Cl.$^6$ .................. C08K 3/40; C08G 63/52; C08L 67/06

[52] U.S. Cl. .................. 523/500; 528/272; 528/306; 528/307; 525/168; 525/445; 523/527

[58] Field of Search .................. 528/272, 306, 528/307; 525/445, 168; 523/500, 527; 428/221

[56] References Cited

U.S. PATENT DOCUMENTS

| | | | |
|---|---|---|---|
| 5,318,853 | 6/1994 | Bayha et al. | 428/431 |
| 5,373,058 | 12/1994 | Hager et al. | 525/168 |

FOREIGN PATENT DOCUMENTS

| | | |
|---|---|---|
| 48-25090 | 4/1973 | Japan . |
| 52-48158 | 12/1977 | Japan . |
| 324122 | 2/1991 | Japan . |
| 488052 | 3/1992 | Japan . |

*Primary Examiner*—Samuel A. Acquah
*Attorney, Agent, or Firm*—Oblon, Spivak, McClelland, Maier & Neustadt, P.C.

[57] ABSTRACT

The heat-resistant unsaturated polyester resin composition of the present invention consists essentially of ($a_1$) an unsaturated polyester which is obtained by the reaction of ($\alpha_1$) a polybasic acid component containing at least an ethylenic unsaturated polybasic acid with ($\alpha_2$) a polyhydric alcohol component, and ($a_2$) a diluent monomer component for the unsaturated polyester, wherein the polyhydric alcohol component ($\alpha_2$) contains 2-methyl-1,3-propanediol and 1,4-cyclohexanedimethanol in the total amount of 50 mol % or more, and 2-methyl-1,3-propanediol and 1,4-cyclohexanedimethanol are in the molar ratio of 9:1 to 5:5. The fiber-reinforced composite material of the present invention comprises the above resin composition and reinforcing fibers. The molded article manufactured using this composite material exhibits excellent strength and rigidity even under high temperatures of over 200° C., and consequently is useful as fixture pallets to be used in the automatic soldering process of the printed circuit board, and reinforcing rods (stiffeners) for the fixture pallets and other various molded articles to which heat resistance under high temperatures is required.

15 Claims, No Drawings

HEAT-RESISTANT UNSATURATED POLYESTER RESIN COMPOSITION AND HEAT-RESISTANT FIBER-REINFORCED COMPOSITE MATERIAL

BACKGROUND OF THE INVENTION

The present invention relates to an unsaturated polyester resin composition and a fiber-reinforced composite material which are useful for manufacturing a molded article to which heat resistance, strength and rigidity under high temperatures are required.

In the process for mounting semiconductor components onto a printed circuit board, it is general to carry out soldering using an automatic soldering equipment. In the automatic soldering process, soldering is usually carried out by such a manner that: a printed circuit board is fixed with a fixture pallet, and the printed circuit board with the fixture pallet was automatically transported while preventing the occurrence of warp of the printed circuit board, stopped precisely at a predetermined position in the soldering equipment, and soldered in the equipment. The fixture pallet should have high rigidity enough to prevent the occurrence of warp of the printed circuit board under high temperatures at which soldering is carried out. The fixture pallets currently used have been manufactured by impregnating a heat-resistant epoxy resin onto a reinforcing glass fiber mat or the like to thereby obtain a prepreg, laminating the obtained prepregs in several layers, and then molding the resultant laminate with heat and pressure. However, this prepreg method is complicated and also disadvantageous in that the cost for production of the fixture pallet is high since the heat-resistant epoxy resins are relatively expensive. Therefore, it has been demanded to provide a fixture pallet which can be manufactured at lower cost and has excellent heat resistance.

On the other hand, for the purpose of surely preventing the occurrence of warp of the printed circuit board, reinforcing rods (stiffeners) are usually mounted onto the fixture pallet. The stiffener is required to have satisfactory heat resistance and high strength, and therefore, duralumin-type aluminum alloys or titanium alloys have been used for the stiflenet. However, the coefficient of linear thermal expansion required for the fixture pallet is 7.0 to $8.0 \times 10^{-6}$ [1/°C.], whereas, for example, that of an aluminum alloy is much larger as high as $24 \times 10^{-6}$ [1/°C.]. Accordingly, if the above fixture pallet is repeatedly used in the automatic soldering process, the screw clamp between the fixture pallet and the stiffener is likely to remove by the influence of the thermal expansion hysteresis which may undergo during the soldering process, which is unfavorable.

For solving the above problem, it has been attempted to use the same material for the stiffener as that for the fixture pallet. For example, a stiffener is manufactured by cutting a laminate comprising an epoxy resin having heat resistance and glass fiber cloths into an suitable size. However, this method is not practically advantageous, since the laminate itself is expensive and the cost for cutting the laminate is additionally needed. As the method for manufacturing a stiffener at relatively low cost, a pultrusion molding method has been proposed. However, this method also has problems that, in the case where an epoxy resin or a phenol resin is used, it is difficult to carry out pultrusion, and that, in the case where an unsaturated polyester resin is used, the deterioration in physical properties of the resultant molded article, such as strength and rigidity, may occur during the soldering process under high temperatures.

As mentioned above, a stiffener for fixture pallet, which can be manufactured at low cost and has excellent heat resistance, has not been developed yet. Therefore, there has been strongly demanded a novel resin for pultrusion, which can provide a molded article having desired characteristics.

As the current methods for manufacturing a molded article excellent in strength and rigidity under high temperatures using an unsaturated polyester resin, there are mentioned, for example, methods which are respectively characterized in: (1) that the amount ratio of the unsaturated dibasic acid in the acid component is increased; (2) that isophthalic acid or terephthalic acid is used as the saturated dibasic acid; and (3) a polyfunctional monomer, such as divinyl benzene and triallyl isocyanurate, is incorporated as the diluent monomer. In addition, there have been disclosed an unsaturated polyester resin which is produced using 2-methyl-1,3-propanediol as the polyhydric alcohol component in an amount of 5 to 10 mol % based on the total amount of the entire glycol components (Japanese Patent Application laid-open Nos. Sho 48-25090, Hei 3-24122 and Hei 4-88052) and an unsaturated polyester resin which is produced using cyclohexane dimethanol as the polyhydric alcohol component (Japanese Patent Publication No. Sho 52-48158), which resins are proposed for the purpose of improving heat resistance, water resistance and hardness of the unsaturated polyester resins. However, even if any one of the above resins is used, the resultant molded article having satisfactory strength and rigidity under high temperatures has not been obtained yet.

SUMMARY OF THE INVENTION

It is an object of the present invention to solve the above problems and to provide an unsaturated polyester resin composition and a fiber-reinforced composite material comprising the resin composition, both of which are useful for manufacturing a molded article such as fixture pallets and stiffeners, which have satisfactory heat resistance, strength and rigidity under high temperatures.

The unsaturated polyester composition resin according to the present invention is characterized by consisting essentially of ($a_1$) an unsaturated polyester which is obtained by the reaction of ($\alpha_1$) a polybasic acid component containing at least an ethylenic unsaturated polybasic acid with ($\alpha_2$) a polyhydric alcohol component, and ($a_2$) a diluent monomer component for diluting the unsaturated polyester resin, wherein ($\alpha_2$) the polyhydric alcohol component contains 2-methyl-1,3-propanediol and 1,4-cyclohexanedimethanol in the total amount of 50 mol % or more based on the total amount of the polyhydric alcohol component, and the molar ratio of 2-methyl-1,3-propanediol to 1,4-cyclohexanedimethanol is within the range from 9:1 to 5:5. The fiber-reinforced composite material according to the present invention is particularly characterized by blending the above unsaturated polyester resin composition with reinforcing fibers. Furthermore, a molded article manufactured using the above unsaturated polyester resin composition and the above composite material are also involved in the scope of the present invention.

DETAILED DESCRIPTION OF THE INVENTION

In the present invention, the term "unsaturated polyester resin" means a liquid resin which is obtained by esterifying an polybasic acid component containing at least an ethylenic unsaturated polybasic acid with a polyhydric alcohol component to give an unsaturated polyester, and then dissolving the resultant unsaturated polyester in a diluent vinyl monomer. Since the unsaturated polyester thus obtained has an ethylenic double bond in its main chain, it is likely to cause the three-dimensional curing reaction of the unsaturated polyester with the diluent vinyl monomer in the presence of a polymerization initiator.

In the unsaturated polyester resin composition of the present invention, the most important characteristic is that the polyhydric alcohol component to be used as raw material for the unsaturated polyester consists essentially of both 2-methyl-1,3-propanediol and 1,4-cyclohexanedimethanol. If the polyhydric alcohol component does not contain both the above two polyhydric alcohols, the resultant molded article exhibits insufficient heat resistance. Moreover, in the present invention, in view of the improvement of heat resistance of the resultant molded article, it is essential that the polyhydric alcohol component contains 2-methyl-1,3-propanediol and 1,4-cyclohexanedimethanol in the total amount of 50 mol % or more preferably 80 mol % or more, based on the total amount of the polyhydric alcohol component, and the molar ratio of 2-methyl-1,3-propanediol to 1,4-cyclohexanedimethanol is within the range from 9:1 to 5:5. If the molar amount of 2-methyl-1,3-propanediol is over 9 times that of 1,4-cyclohexanedimethanol in the total amount of the polyhydoric alcohol component, the resultant molded article tends to exhibit poor heat resistance. On the other hand, if the molar amount of 2-methyl-1,3-propanediol is less than the equivalence to that of 1,4-cyclohexanedimethanol, the compatibility between the resultant unsaturated polyester and the diluent monomer component tends to become poor.

In addition to the above two polyhydric alcohols, other known polyhydric alcohols may be used, such as ethylene glycol, propylene glycol, diethylene glycol, dipropylene glycol, 1,6-hexanediol, neopentyl glycol and bisphenol A.

In the unsaturated polyester, any known polybasic acid component may be used as long as the polyhydric alcohol component to be used satisfies the above requirements. Specifically, the polybasic acid component may be only an ethylenic unsaturated polybasic acid, or may be a mixture of the above unsaturated polybasic acid and a saturated polybasic acid. Examples of the ethylenic unsaturated polybasic acids include maleic acid anhydride, fumaric acid, itaconic acid and the like. Examples of the saturated polybasic acids include phthalic acid anhydride, isophthalic acid, terephthalic acid, adipic acid, tetrahydrophthalic anhydride, endomethylenetetrahydrophthalic anhydride, methyl nadic anhydride and the like. The unsaturated polyester can be obtained by esterifying the above acid component with the polyhydric alcohol component under any known reaction condition.

The unsaturated polyester resin of the present invention can be obtained by diluting the above unsaturated polyester with a diluent monomer component to have suitable viscosity. The preferable diluent monomer component is generally styrene, or vinyltoluene, divinylbenzene, diallyl phthalate or triallyl isocyanurate for improving the heat resistance of the resultant resin. In addition, α-methylstyrene, t-butylstyrene and methyl methacrylate may also be used. These diluent monomers may be used singly or as mixtures of two or more of them. It is preferred to use the diluent monomer component in a total amount within the range from 10 to 80 wt %, preferably from 30 to 65 wt %, based on the total amount of the resultant unsaturated polyester resin.

The unsaturated polyester resin of the invention which comprises those components as set out hereinbefore is also to yield a highly crosslinked, cured product which are excellent in high temperature stiffness and strength, heat resistance and chemical resistance. To obtain the cured product, it is necessary to additionally use an organic peroxide as a polymerization initiator. With respect to the above organic peroxide, there is no particular limitation, and any known organic peroxide may be used, such as t-butyl perbenzoate, t-butyl peroctoate, dicumyl peroxide, benzoyl peroxide and t-butyl peroxyisopropylcarbonate. The organic peroxide may be used in an amount within the range from 0.3 to 5 parts by weight based on 100 parts by weight of the unsaturated polyester resin in addition, the unsaturated polyester resin of the present invention may be incorporated with a vinyl ester resin, a vinyl oligomer resin, an epoxy resin or the like in an amount of 30 wt % or less based on the total amount of the unsaturated polyester resin.

The composite material of the present invention consists essentially of the above unsaturated polyester resin composition and reinforcing fibers. The reinforcing fibers to be used are preferably glass fibers, which are relatively cheap. Other types of known reinforcing fibers may also be used, such as carbon fibers, aramid fibers, metal fibers and ceramic fibers. With respect to the forms of the fibers, for manufacturing a molded article like a fixture pallet, for example, a long-fiber mat of non-woven cloth type or textile fabric type, and long or short chopped strand can be employed. On the other hand, for manufacturing a stiffener, it is preferred to employ a pultrusion molding method using rovings. The amount of the reinforcing fibers to be contained in the resultant composite material may varied depending on the types of the intended composite material and the molded article. For example, in the case where a fixture pallet, a stiffener or the like is manufactured, the total amount of the reinforcing fibers is preferably 30 to 80 wt % based on the total amount of the resultant molded article.

The composite material of the present invention may be incorporated with other additives as long as the composite material is not impaired in heat resistance, strength and rigidity under high temperatures. Examples of such additives include low-shrink agents, such as polystyrene, styrene-butadiene copolymer, poly(vinyl acetate), poly(methyl methacrylate), saturated polyester and other known thermoplastic resins; and inorganic fillers such as aluminum hydroxide, talc, clay, kaolin, calcium carbonate, barium sulfate, calcium sulfate and mica. Other additives may also be used, such as antioxidants, flame retardants, mold release agents, pigments, lubricants, electroconducting agents, antifoaming agents, wetting agents, thickening agents, colorant, polymerization inhibitors and the like.

As a method for producing a plate-shaped molded article like a fixture pallet, the following method may be employed. That is, a reinforcing long-fiber mat of single-layer or multilayer is laminated in a mold, and the above unsaturated polyester resin composition is impregnated onto the reinforcing long-fiber mat, and then tile resultant is subjected to the molding process under heat and pressure, to thereby obtain the objective molded article. In this method, the shape of the resulting molded article may be varied depending on the methods for laminating the reinforcing fiber or the type of the molds to be used. The composite material thus obtained is widely useful, as well as useful as a laminated material for a fixture pallet. On the other hand, as a method for producing a rod-shaped molded article like a stiffener, a pultrusion molding method may be recommended. For example, reinforcing fiber rovings arc passed through a impregnating vessel containing the above unsaturated polyester resin composition, and the resultant is passed through a heated mold and continuously pultruded using a drawing machine, to thereby obtain the objective rod-shaped molded article. Alternatively, the molded article of the present invention may be produced by the method in which reinforcing fiber chopped strands are laminated into a mold, the unsaturated polyester resin composition is then impregnated onto the chopped strands, and then the resultant is subjected to molding, thereby obtaining a molded article.

The molded article of the present invention thus produced has excellent heat resistance, strength and rigidity under high temperatures, chemical resistance and the like. Accordingly, the molded article can be used as a fixture pallet and a stiffener. In addition, it is also useful as other molded articles requiring high heat resistance.

EXAMPLES

Example 1

13.5 moles of maleic anhydride and 1.5 moles of endomethylene tetrahydrophthalic anhydride as the acid component was esterified with 11.25 moles of 2-methyl-1,3-propanediol and 3.75 moles of 1,4-cyclohexanedimethanol as the polyhydric alcohol component by the conventional method, to thereby obtain an unsaturated polyester having an acid value of 18.0. Vinyl toluene was mixed with the obtained unsaturated polyester so that the content of the vinyl toluene in the resultant mixture became 40 wt %, to thereby obtain an unsaturated polyester resin (hereinafter, referred to as "UP-A").

To 100 parts by weight of the obtained UP-A, were added 24 parts by weight of vinyl toluene, and 0.3 part by weight of dicumyl peroxide and 0.4 part by weight of benzoyl peroxide as the polymerization initiator. Then, as a polymerization inhibitor 0.003 part by weight of p-benzoquinone and 0.05 part by weight of t-butyl paracresol were added to the mixture, to thereby obtain a resin solution. To 65 parts by weight of the obtained resin solution, were added 33 parts by weight of kaolin, 1 part by weight of zinc stearate as the mold release agent and 1 part by weight of carbon black. The resultant was mixed uniformly, to thereby obtain a mixed resin solution. The mixed resin solution thus obtained was poured onto glass fiber non-woven cloths which had been laminated in a mold so that the weight ratio of the mixed resin solution to the glass fiber became 50:50. The resultant was subjected to compression molding with heat and pressure at 140° C. for 5 minutes, to thereby obtain a molded plate having a thickness of ¼ inch. The obtained molded article exhibited a glass transition temperature of 180° C. as determined above, by which it was demonstrated that this molded article had satisfactory heat resistance.

The obtained molded article was cut into pieces 2 inches square. When the pieces were dipped into a vessel containing a molten solder of 300° C. for 10 minutes, no undesirable phenomenon, such as delamination, was not observed. In addition, the molded article was determined its flexural characteristics by the three-point flexural test according to the procedure prescribed in ASTM D790-66 using a test machine "Instron 4204 Type", resulting in the flexural strength of 26000 psi and the flexural modulus of $2.23 \times 10^6$ psi at room temperature, and the flexural strength of 10000 psi and the flexural modulus of $0.93 \times 10^6$ psi at 200° C. As a result, it was found that the obtained molded article had satisfactory strength and rigidity. Accordingly, the obtained molded article was useful as a fixture pallet for an automatic soldering equipment.

Example 2

Substantially the same procedure as in Example 1 was conducted, except that a mixture of 80 parts by weight of the unsaturated polyester resin UP-A obtained in Example 1 and 20 parts by weight of a vinyl ester resin ("Derakane 470-2000"; manufactured by Dow Chemical Co., Ltd.) was used as the base resin, thereby obtaining a molded article. The obtained molded article exhibited a glass transition temperature of 183° C., and was not observed undesirable phenomenon, such as delamination as the result of the dipping test into a vessel containing molten solder of 300° C.

In addition, the molded article was determined its flexural characteristics, resulting in the flexural strength of 36000 psi and the flexural modulus of $2.24 \times 10^6$ psi at room temperature, and the flexural strength of 13000 psi and the flexural modulus of $1.11 \times 10^6$ psi at 200° C. As a result, it was found that the obtained molded article had satisfactory strength and rigidity.

Example 3

Substantially the same procedure as in Example 1 was conducted, except that the mixed rein solution was prepared by mixing 88 parts by weight of the prepared resin solution of Example 2 with 10 parts by weight of kaolin, 1 part by weight of zinc stearate and 1 part by weight of carbon black, and then the obtained mixed resin solution was poured onto glass fiber non-woven cloths which had been laminated in a mold so that the weight ratio of the mixed resin solution to the glass fiber became 30:70, thereby obtaining a molded article. The obtained molded article exhibited a glass transition temperature of 183° C., and was not observed undesirable phenomenon, such as delamination as the result of the dipping test into a vessel containing molten solder of 300° C. In addition, the molded article was determined its flexural characteristics, resulting in the flexural strength of 38000 psi and the flexural modulus of $2.76 \times 10^6$ psi at room temperature, and the flexural strength of 14300 psi and the flexural modulus of $1.52 \times 10^6$ psi at 200° C. As a result, it was found that the obtained molded article had satisfactory strength and rigidity.

Comparative Example 1

3 moles of maleic acid anhydride and 2 moles of isophthalic acid as the acid component was esterified with 5 moles of 1,2-propylene glycol as the polyhydric alcohol component by the conventional method, to thereby obtain an unsaturated polyester having an acid value of 19.6. Vinyl toluene was mixed with the obtained unsaturated polyester so that the content of the vinyl toluene in the resultant mixture became 40.0 wt %, to thereby obtain an unsaturated polyester resin (hereinafter, referred to as "UP-B").

An molded article was produced substantially the same procedure as in Example 1, except that the above UP-B was used instead of UP-A in Example 1. The obtained molded article exhibited a glass transition temperature of 151° C., which was demonstrated that this molded article had poor heat resistance. In addition, as the result of the dipping test into a vessel containing molten solder of 300° C., delamination occurred. Therefore, it was found that the obtained molded article was not useful as a fixture pallet.

Comparative Example 2

Substantially the same procedure as in Example 1 was conducted, except that a vinyl ester resin ("Derakant 470-2000"; manufactured by Dow Chemical Co., Ltd.) was used instead of UP-A in Example 1, to thereby obtain a molded article. The obtained molded article exhibited a glass transition temperature of 149° C., by which it was demonstrated that this molded article had poor heat resistance. In addition, as the result of the dipping test into a vessel containing molten solder of 300° C., delamination occurred. Therefore, it was found that the obtained molded article was not useful as a fixture pallet.

Example 4

To 100 parts by weight of UP-A, were added 24 parts by weight of vinyl toluene, and 0.5 part by weight of t-butyl peroctoate and 0.5 part by weight of t-butyl perbenzoate as polymerization initiators. To the resultant, 0.005 part by weight of p-benzoquinone and 0.05 part by weight of t-butyl paracresol as polymerization inhibitors were added, to thereby obtain a resin solution. To 97 parts by weight of the resultant resin solution, were added 0.5 part by weight of an anti-foaming agent ("BYK-A501"; manufactured and sold by BYK Chemie Co., Ltd.), 0.5 part by weight of a wetting agent ("BYK-W972"; manufactured and sold by BYK Chemie Co., Ltd.) and 2 parts by weight of zinc stearate. The resultant mixture was used as a resin material for pultrusion molding using a pultrusion molding machine ("PUL1-10C"; manufactured by Bagheri Engineering Co., Ltd.). That is, glass fiber rovings were passed through a vessel containing the above resin material, and then passed through a mold of 36 inch long at 150° C. and at a drawing speed of 10 inch/min. to contain the glass fibers in the ultimate molded rod so as to be 65% by volume, to thereby obtain a molded rod for stiffener with sections having a size of ½ inch×¼ inch. The physical properties of the stiffener were determined by measurements of glass transition temperature, flexural strength and flexural modulus in the same methods as those described above, and by a measurement of coefficient of thermal expansion using a test machine "TMA 7 Type" (manufactured by Perkin-Elmer Co., Ltd.). The results are shown in Table 1 below.

In addition, the stiffener was mounted onto a fixture pallet using a screw and a clamp, dipped into a vessel containing a molten solder of 300° C. for 10 minutes and then taken out. As a result, any of warp of the pallet, looseness of the screw and removal of the clamp was not observed.

Example 5

Substantially the same procedure as in Example 4 was conducted, except that 20 parts by weight of a vinyl ester resin ("Derakane 470-2000"; manufactured by Dew Chemical Co., Ltd.) was added to 80 parts by weight of UP-A and, as monomers, 22 parts by weight of vinyl toluene and 5 parts by weight of divinyl benzene were further added thereto, thereby obtaining a stiffener. The physical properties of the stiffener are also shown in Table 1 below. In addition, as the result of the dipping test conducted in the same manner as in Example 4, any of warp of the pallet, looseness of the screw and removal of the clamp was not observed.

Example 6

Substantially the same procedure as in Example 5 was conducted, except that kaolin was added to the molding material for pultrusion molding of Example 5 so that the content of the kaolin became 35 wt % and the content of the glass fibers in the ultimata molded article (stiffener) was adjusted so as to be 51% by volume, thereby obtaining a stifferier. The physical properties of the stiffener are also shown in Table 1 below. In addition, as the result of the dipping test conducted in the same manner as in Example 4, any of warp of the pallet, looseness of the screw and removal of the clamp was not observed.

Example 7

Substantially the same procedure as in Example 4 was conducted, except that the resin solution was prepared by using 11 parts by weight of triallyl isocyanurate and 9 parts by weight of divinyl benzene instead of vinyl toluene, that 10 wt % of calcium carbonate was further added to the molding material for pultrusion in Example 4, and that the content of the glass fibers in the ultimate molded article was adjusted so as to be 55% by volume, thereby obtaining a stiffener. The physical properties of the stiffener are also shown in Table 1 below. In addition, as the result of the dipping test conducted in the same manner as in Example 16, any of warp of the pallet, looseness of the screw and removal of the clamp was not observed.

Comparative Example 3

Substantially the same procedure as in Example 4 was conducted, except that UP-B was used instead of UP-A, thereby obtaining a stiffener. The physical properties of the stiffener arc also shown in Table 1 below. In addition, at the result of the dipping test conducted in the same manner as in Example 4, the stiffener was deformed and the warp of the pallet occurred. Accordingly, it was found that the stiffener was not practically useful for an automatic soldering equipment.

Comparative Example 4

Substantially the same procedure as in Example 4 was conducted, except that a vinyl ester resin ("Derakane 470-2000"; manufactured by Dow Chemlcal Co., Ltd.) was used instead of UP-A, thereby obtaining a stiffener. The physical properties of the stiffener are also shown in Table 1 below. In addition, as the result of the dipping test conducted in the same manner as in Example 4, the stiffener was deformed and the warp of the pallet occurred. Accordingly, it was found that the stiffener was not practically useful for an automatic soldering equipment.

Comparative Example 5

Substantially the same procedure as in Example 6 was conducted, except that UP-B was used instead of UP-A, thereby obtaining a stiffener. The physical properties of the stiffener are also shown in Table 1 below. In addition, as the result of the dipping test conducted in the same manner as in Example 4, the stiffener was deformed and the warp of the pallet occurred. Accordingly, it was found that the stiffener was not practically useful for an automatic soldering equipment.

TABLE 1

|  | Example 4 | Example 5 | Example 6 | Example 7 |
| --- | --- | --- | --- | --- |
| Flexural strength [psi] × $10^4$ (room temperature) | 12.10 | 12.60 | 13.42 | 11.10 |
| Flexural strength [psi] × $10^4$ (200° C.) | 3.37 | 3.57 | 3.89 | 5.55 |
| Flexural modulus [psi] × $10^5$ | 4.99 | 5.447 | 4.534 | 5.10 |

TABLE 1-continued

| | | | | |
|---|---|---|---|---|
| (room temperature) | | | | |
| Flexural modulus [psi] × $10^5$ (200° C.) | 3.90 | 4.43 | 3.764 | 3.87 |
| Coefficient of linear thermal expansion × $10^{-6}$ [1/°C.] | 8.2 | 7.9 | 7.3 | 7.5 |
| Content of glass fibers (% by volume) | 65 | 59 | 51 | 55 |
| Glass transition temperature [°C.] | 183 | 190 | 190 | 193 |

| | Comparative Example 3 | Comparative Example 4 | Comparative Example 5 |
|---|---|---|---|
| Flexural strength [psi] × $10^4$ (room temperature) | 12.00 | 12.89 | 13.21 |
| Flexural strength [psi] × $10^4$ (200° C.) | 1.18 | 1.33 | 1.45 |
| Flexural modulus [psi] × $10^5$ (room temperature) | 5.428 | 4.53 | 4.62 |
| Flexural modulus [psi] × $10^5$ (200° C.) | 2.60 | 1.812 | 1.997 |
| Coefficient of linear thermal expansion × $10^{-6}$ [1/°C.] | 8.4 | 7.9 | 7.3 |
| Content of glass fibers (% by volume) | 65 | 65 | 51 |
| Glass transition temperature [°C.] | 155 | 145 | 147 |

As shown in Table 1, it was found that all of the molded articles (stiffeners) obtained using the composite materials of the present invention (Examples 4 to 7) had excellent flexural characteristics at room temperature and even at a high temperature and found satisfactory heat resistance. It was also found that the molded articles of the present invention had high coefficient of linear thermal expansion required for a stiffener, 7 to $8 \times 10^{-6}$ [1/x °C.]. On the contrary, the molded articles of Comparative Examples were inferior in heat resistance and, consequently, were not useful as stiffeners.

Effect of the Invention

As described above, the unsaturated polyester resin composition of the present invention has excellent heat resistance. Therefore, the composite material comprising this resin composition also has excellent heat resistance and, furthermore, can be molded into a cured article excellent in strength and rigidity even under high temperatures, which is useful for manufacturing fixture pallets and stiffeners for printed circuit board and other various molded articles requiring excellent heat resistance.

What is claimed is:

1. A heat-resistant fiber-reinforced composite material comprising an unsaturated polyester resin composition consisting essentially of ($a_1$) an unsaturated polyester which is obtained by the reaction of ($\alpha_1$) a polybasic acid component containing at least an ethylenic unsaturated polybasic acid with ($\alpha_2$) a polyhydric alcohol component, and ($a_2$) a diluent monomer component for diluting said unsaturated polyester; and a reinforcing fiber component, wherein said polyhydric alcohol component ($\alpha_2$) contains 2-methyl-1,3-propanediol and 1,4-cyclohexanedimethanol in the total amount of 50 mol % or more based on the total amount of the polyhydric alcohol component, and the molar ratio of said 2-methyl-1,3-propanediol and 1,4-cyclohexanedimethanol is within the range of from 9:1 to 5:5.

2. The composite material according to claim 1, wherein said polyhydric alcohol component ($\alpha_2$) consists of 2-methyl-1,3-propanediol and 1,4-cyclohexanedimethanol.

3. The composite material according to claim 1 or 2, wherein said diluent monomer component ($a_2$) comprises at least one monomer selected from the group consisting of styrene, vinyltoluene, divinylbenzene, diallyl phthalate and triallyl isocyanurate.

4. A molded material comprising the composite material according to claim 1, obtained by molding said composite material in the shape of a fixture pallet.

5. A molded material comprising the composite material according to claim 2, obtained by molding said composite material in the shape of a fixture pallet.

6. A molded material comprising the composite material according to claim 3, obtained by molding said composite material in the shape of a fixture pallet.

7. A molded material comprising the composite material according to claim 1, obtained by molding said composite material in the shape of a stiffener for a fixture pallet.

8. A molded material comprising the composite material according to claim 2, obtained by molding said composite material in the shape of a stiffener for a fixture pallet.

9. A molded material comprising the composite material according to claim 3, obtained by molding said composite material in the shape of a stiffener for a fixture pallet.

10. In a fixture pallet comprising a molded material, the improvement comprising using the composite material according to claim 1 as said material.

11. In a fixture pallet comprising a molded material, the improvement comprising using the composite material according to claim 2 as said material.

12. In a fixture pallet comprising a molded material, the improvement comprising using the composite material according to claim 3 as said material.

13. In a stiffener for a fixture pallet comprising a molded material, the improvement comprising using the composite material according to claim 1 as said material.

14. In a stiffener for a fixture pallet comprising a molded material, the improvement comprising using the composite material according to claim 2 as said material.

15. In a stiffener for a fixture pallet comprising a molded material, the improvement comprising using the composite material according to claim 3 as said material.

* * * * *